(12) United States Patent
Vesely (10) Patent No.: US 8,738,528 B2
(45) Date of Patent: May 27, 2014

(54) METHOD AND APPARATUS FOR OPERATING A SELF-SERVICE TERMINAL (SST)

(75) Inventor: Jan Vesely, Monifieth (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/436,215

(22) Filed: Mar. 30, 2012

(65) Prior Publication Data
US 2013/0262304 A1    Oct. 3, 2013

(51) Int. Cl.
*G06Q 40/02*    (2012.01)

(52) U.S. Cl.
USPC ............................................................ 705/43

(58) Field of Classification Search
CPC .................................................. G06Q 20/1085
USPC ............................................................ 705/43
See application file for complete search history.

(56) References Cited

U.S. PATENT DOCUMENTS

| 8,255,001 | B2 * | 8/2012 | Hardy et al. .................. 455/564 |
| 2002/0057259 | A1 * | 5/2002 | Suzuki .......................... 345/168 |
| 2007/0063988 | A1 * | 3/2007 | Suzuki et al. ................. 345/173 |

* cited by examiner

*Primary Examiner* — Jagdish Patel
(74) *Attorney, Agent, or Firm* — Joseph P. Merhle (57) ABSTRACT

A self-service terminal (SST) and a method of operating an SST are disclosed. The method comprises the steps of selecting a default characteristic for a service offered at the SST responsive to a normal press of a user button element associated with the service, indicating a plurality of selectable characteristics responsive to a long press of the user button element and selecting a chosen characteristic for the service responsive to a press of a user button element associated with one of said selectable characteristics.

15 Claims, 4 Drawing Sheets

| TABLE ENTRY | NO. OF BYTES | CONTENTS | DESCRIPTION |
|---|---|---|---|
| 1 | 1 | State Type | 'z' - Master Expansion State |
| 2 | 3 | Sub State Type | 'xxx' - Long Press Selection State. Note that the xxx number would have to be allocated when this idea is realised. |
| 3 | 3 | Screen Number (range 000-999) | Screen that is shown after the customer used a long-press menu selection in the previous NDC menu selection state. It prompts the customer to make a choice between up to 3 alternatives. This screen must match and be aligned with the active FDKs. |
| 4 | 3 | Timeout Next State Number | State number the terminal proceeds to after timeout. |
| 5 | 3 | Cancel Next State Number | State number the terminal proceeds to after customer cancelled the transaction. |
| 6 | 3 | FDK A Next State Number | State number the terminal proceeds to if the customer pressed the specified FDK. The FDK should always be active as it represents the default sub option. |
| 7 | 3 | FDK B Next State Number | State number the terminal proceeds to if the customer pressed the specified FDK. (Use value 255 to deactivate this FDK). |
| 8 | 3 | FDK C Next State Number | State number the terminal proceeds to if the customer pressed the specified FDK. (Use value 255 to deactivate this FDK). |
| 9 | 3 | Buffer Location (range 000-007) | Specifies the byte of the operation code (OpCode) buffer in which the key code for the selected FDK is to be stored, as follows:<br>"000" = 1st byte in buffer<br>"001" = 2nd byte in buffer<br>"002" = 3rd byte in buffer<br>"003" = 4th byte in buffer<br>"004" = 5th byte in buffer<br>"005" = 6th byte in buffer<br>"006" = 7th byte in buffer<br>"007" = 8th byte in buffer |

| | | | |
|---|---|---|---|
| | | CASH WITHDRAWAL | >> |
| | | CASH DEPOSIT | >> |
| | | BALANCE ENQUIRY | >> |
| | | MINI STATEMENT | >> |

FIG. 5b

| | | | |
|---|---|---|---|
| | | CASH WITHDRAWAL | >> |
| | | CASH DEPOSIT | >> |
| | | BALANCE ENQUIRY | >> |
| | | MINI STATEMENT | >> |

FIG. 5c

| | | | |
|---|---|---|---|
| | | 5 LAST TRANSACTIONS | >> |
| | | 10 LAST TRANSACTIONS | >> |
| | | ALL SINCE LAST STATEMENT | >> |
| | | | |

FIG. 5

METHOD AND APPARATUS FOR OPERATING A SELF-SERVICE TERMINAL (SST)

FIELD OF THE INVENTION

The present invention relates to a self-service terminal (SST) and a method of operating a self-service terminal. In particular, but not exclusively, the invention relates to a method of providing a user of a self-service terminal with a service which is delivered in a way that is determined by a manner in which the user selects the service.

BACKGROUND OF THE INVENTION

Self-service terminals (SSTs), such as automated teller machines (ATMs) or the like, can be controlled remotely using a host that downloads a transaction flow to the SST. For example, NCR Corporation (trade mark) uses a proprietary message interface to allow a host to control an ATM. This proprietary message interface is called NCR Direct Connect (NDC). Other proprietary message interfaces are also available that enable a remote host to control an ATM and it will be appreciated that the present invention is not limited to use with the NDC interface. SSTs that are controlled remotely by a host (rather than by an application executing on the SST) are referred to herein as "state-driven SSTs". As used herein, "state-driven SSTs" do not include any SST that uses a local application that is programmed with its own transaction flow. State-driven SSTs receive a transaction flow in the form of tables (including state, screen, and parameter information) downloaded from a remote host. It will also be appreciated that the present invention is not limited to use with a state driven terminal.

The proprietary message interfaces typically operate based on one or more tables of states and screens. When an ATM boots up, it receives the download of any necessary state and screen information (either the complete information or an update for existing information) from a control application executing on the remote host. The ATM can then offer transactions to a customer. This is achieved by displaying one or more screens showing options and information and by allowing a user to indicate one or more selections by interacting with a user interface such as by pressing a button or a region of a touchscreen. Once the ATM has gathered the necessary details from the customer (such as card data, PIN data, transaction data, and the like), it then sends a transaction request to the remotely-located control application and receives a response. This response instructs the ATM to perform certain actions, such as dispensing a requested amount of currency notes if the transaction is authorised, or presenting a screen to the customer informing the customer that the transaction has not been approved, in the event that the transaction is declined.

Each ATM stores a state table, which typically comprises the state number, state type, parameters, configuration data, screen numbers, next state information, and screen data. In general, where a screen is present it is displayed when the state is entered, the ATM performs the action specified by the state type, and the transaction flow moves to the specified next state. Where a plurality of screens is defined for the same state, then each screen may be displayed in sequence prior to the ATM advancing to the next state.

One problem with state-driven ATMs is that the ATM does not know what it is presenting to the customer, all it knows is that it is presenting a pre-defined screen identified by a screen number (from the state table), and that it is enabling pre-defined Function Display Keys (FDKs) as indicated by the parameters (from the state table).

Another problem is that as the trend continues for providing customers with more and more transactions which are selectable at an SST, customers are being faced with more complex menus. Complex and confusing menus can lead to user error and it is therefore desirable to be able to provide an option list in as clear a manner as possible. It will be appreciated that the fewer options there are, the easier it is for a customer to select a desired option and initiate it. On the other hand, some customers wish to be able to specify some aspect of how a transaction is conducted. For example, when carrying out a cash withdrawal process, most customers just wish to enter an amount and quickly complete a transaction. However, some customers might want to specify a required note mix or opt for a receipt via e-mail option etc., in addition to receiving the set amount. Likewise, when a customer requests a mini statement, many customers are happy with a pre-defined number of last transactions being shown on the mini statement. However, some users may wish to specify the number of last transactions they wish to be printed. Still further, in terms of depositing currency notes at an SST, most customers are happy merely to select a deposit cash only option. However, some customers may wish to specify whether the deposit should be only enabled for currency notes or also for cheques or they may wish to enter a receiving account number which, if not entered, would default to their account number associated with an input card.

is There is thus currently a problem associated with giving customers a good choice of characteristics which may be selected when a service is provided and yet which can also provide customers with a service in a way which is uncomplicated when needed.

SUMMARY OF THE INVENTION

It is an aim of embodiments of the present invention to at least partly mitigate the above-mentioned problems.

It is an aim of certain embodiments of the present invention to provide a self-service terminal which includes a user interface which enables a user to conveniently pick how a desired service should be provided.

It is an aim of certain embodiments of the present invention to provide a method of operating a self-service terminal (SST) whereby a normal press or long press on a user button is used to determine characteristics of a service which is to be provided.

According to a first aspect of the present invention, there is provided method of operating a self-service terminal (SST), comprising the steps of:
  selecting a default characteristic for a service offered at the SST responsive to a normal press of a user button element associated with the service;
  indicating a plurality of selectable characteristics responsive to a long press of the user button element; and
  selecting a chosen characteristic for the service responsive to a press of a user button element associated with one of said selectable characteristics.

Optionally, the SST may be a state-driven SST.

Aptly, the method further comprises providing state table data associated with said a service, said data comprising a screen number identifying a screen displayed to indicate the selectable characteristics.

Aptly, the method further comprises providing said state table data from a host node remote from said SST; and storing said state table data at the SST.

Aptly, the method further comprises providing said state table data on power up of the SST.

Aptly, each step of pressing a user button comprises a user pressing a key on a user interface of the SST or a user pressing a respective region of a touchscreen element of a user interface of the SST.

Aptly, the SST is an automated teller machine (ATM) and the service comprises one of providing a mini statement or providing a currency withdrawal or providing a currency deposit at the ATM.

Aptly, said step of indicating a plurality of selectable characteristics comprises displaying a screen identifying the plurality of selectable characteristics, said selectable characteristics including said default characteristic.

Aptly, the method further includes storing at least a character associated with the default characteristic or chosen characteristic in an operation code (OpCode) buffer at the SST.

Aptly, the method further comprises transmitting stored OpCode buffer data to a host node remote from said SST; and receiving an authorisation signal from the host node responsive to the transmitted buffer data.

Aptly, the method further comprises providing a selectable service to a user of the SST.

According to a second aspect of the present invention there is provided a self-service terminal (SST), comprising:

a user interface comprising a plurality of user button elements arranged with respect to a display screen element; and a state information module storing state table data that determines a cycle of operation of the SST; wherein at least one state from the plurality of possible states of the cycle of operation comprises a state in which a characteristic of a service selected by a user is chosen subsequent to determining if the user selected the service by executing a long press or normal press on a user button element associated with the selected service.

Aptly, the state table data comprises a screen number that indexes screen data to be displayed on the display screen element subsequent to execution of a long press.

Aptly, the state table data comprises the byte of an operation code (OpCode) buffer in which a key code associated with a pressed user button element is storable.

Aptly, the display screen element comprises a display screen and the user button elements comprise buttons adjacent to at least one edge region of the screen or the display screen element comprises a touchscreen and said user button elements comprise respective regions of the touchscreen.

Aptly, the terminal comprises logic and/or circuitry and/or software and/or a keypad and/or a keyboard and/or a touchscreen or the like to determine a length of a button press.

According to a third aspect of the present invention there is provided a method of providing a user of a self-service terminal (SST) with a service, comprising the steps of:

providing a service in a first mode of operation responsive to a user selecting the service via a first mode of selection; and providing the service in a further mode of operation responsive to the user selecting the service via a further mode of selection.

Aptly, the term "screen" relates to data, not a physical device and the term "display" when used as a noun refers to a physical device. Thus, a succession of screens can be presented (or rendered) on a display.

Aptly, the self-service terminal may be an automated teller machine (ATM), an information kiosk, a financial services centre, a bill payment kiosk, a lottery kiosk, a postal services machine, a cheque-in and/or cheque-out terminal such as those used in the retail, hotel, car rental, gaming, health care or any airline industries or the like.

According to a fourth aspect of the present invention there is provided a network of self-service terminals. Aptly, the network includes a host including a controller application and a plurality of self-service terminals, each comprising a user interface comprising a plurality of user button elements arranged with respect to a display screen element; and a state information module storing state table data that determines a cycle of operation of the SST; wherein at least one state from the plurality of possible states of the cycle of operation comprises a state in which a characteristic of a service selected by a user is chosen subsequent to determining if the user selected the service by executing a long press or a normal press on a user button element associated with the selected service.

Certain embodiments of the present invention provide the advantage that a user interface is simplified whilst still offering a variety of transactions and ways in which those transactions are carried out. The provided methodology is very easy for a user to learn.

Certain embodiments of the present invention provide the advantage that a self-service terminal (SST) is used in which a state flow is used to configure a transaction selection flow.

Certain embodiments of the present invention provide the advantage that a central transaction processing system (remote host node) does not need to be modified to enable the improved functionality. The addition of a new state which provides the improved functionality is dealt with locally at the SST.

BRIEF DESCRIPTION OF THE DRAWINGS

Embodiments of the present invention will now be described hereinafter, by way of example only, with reference to the accompanying drawings in which:

FIG. 4 is a table describing a long press state; and

DETAILED DESCRIPTION

In the drawings like reference numerals refer to like parts.

Figure 1:
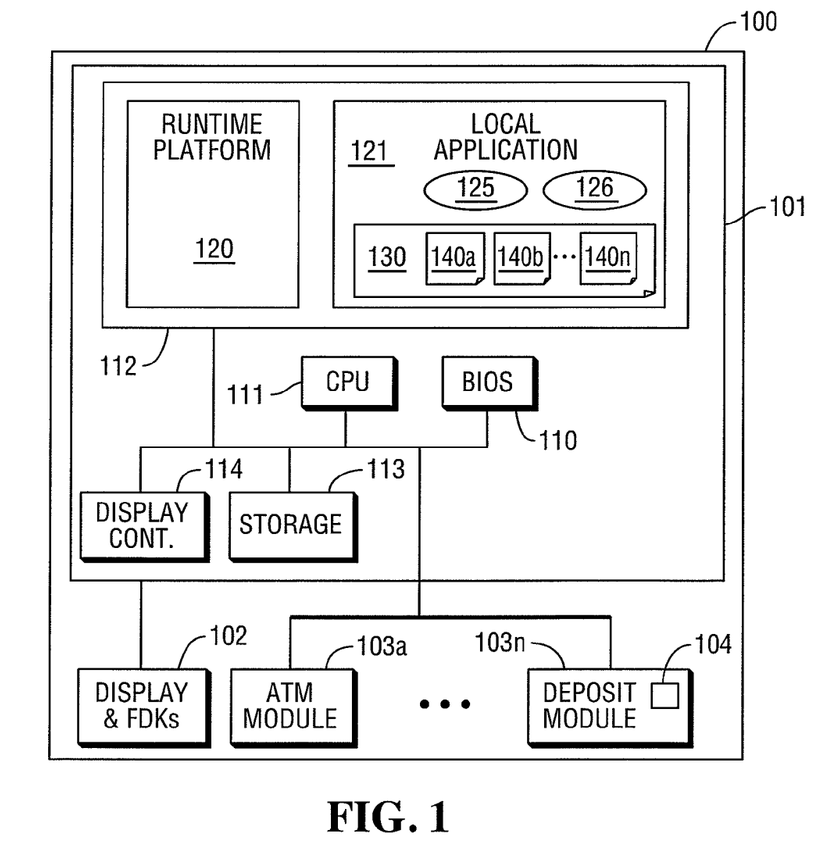
FIG. 1 is a simplified schematic diagram of a state-driven self-service terminal according to one embodiment of the present invention.

Reference is made to FIG. 1, which is a simplified, schematic diagram of a state-driven self-service terminal (SST) 100, in the form of an automated teller machine (ATM), according to one embodiment of the present invention.

The ATM 100 comprises a plurality of modules for enabling transactions to be executed and recorded by the ATM 100. These ATM modules comprise: a controller module 101, a customer display module 102, and various other user interface modules and internal ATM modules (labelled 103a to 103n), which are not shown in detail. One of these modules is a depository module 103n having an escrow 104.

The controller 101 comprises a Basic Input Output System (BIOS) 110 stored in non-volatile memory, a microprocessor 111, main memory 112, storage 113 in the form of a magnetic disk drive, and a display controller 114 in the form of a graphics card for controlling the customer display module 102 and any operator panel (not shown) that is present.

When the ATM is powered up, the main memory 112 is loaded with an ATM runtime platform 120 (which functions, inter alia, as a monitoring component) and a local application 121, both of which are stored on the magnetic disk drive 113.

The ATM runtime platform 120 includes: (i) components from a conventional operating system (in this embodiment, Windows XP (trade mark), available from Microsoft Corporation (trade mark)), and (ii) proprietary components. Other components such as the use of Windows 7 or the like could of course be utilised.

The local application 121 (i) presents a sequence of screens on the ATM display module 102 to a customer at the ATM, (ii) collates information from the customer via the ATM modules 102, 103 and the runtime platform 120 (for example, customer account information from a customer's ATM card, transaction request, transaction amount, and the like), (iii) transmits a transaction request to a remote authorisation server (not shown), and (iv) instructs modules within the ATM 100, in response to commands received from the remote authorisation server to fulfil the transaction request.

The local application 121 includes a message interface component 125, and a screen control component 126. The local application 121 also stores a state information table 130 (populated with data downloaded from a remote host), including a plurality of screen dictionaries 140a,b . . . n.

The message interface component 125 implements the message interface such as the NCR Direct Connect (NDC) message interface or the like and enables the ATM 100 to communicate with a control application (not shown) executing on a remote authorisation server (not shown).

The screen control component 126 communicates with the runtime platform 120 to receive status information. This status information includes customer selections at the ATM 100, the state of modules 103 within the ATM 100, events occurring within the modules 103 of the ATM 100, and the like.

Figure 2:
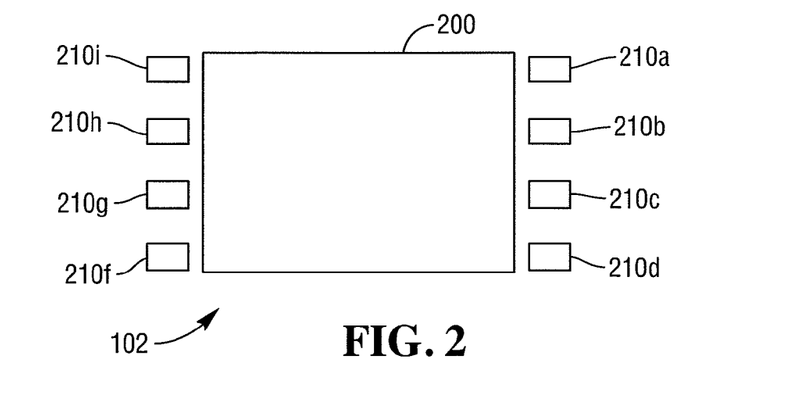
FIG. 2 is a schematic diagram showing a part (the customer display module) of the terminal of FIG. 1 in more detail.

As shown in more detail in FIG. 2, the customer display module 102 comprises an LCD display panel 200 and eight function display keys (FDKs) (labelled 210a to 210i—there is no 210e) arranged as two columns of four FDKs located opposite each other and on either vertical side of the front of the LCD display panel 200. These allow for customer input. Each key may thus behave as a user button to enable a user to indicate a selection. The 'button' can of course have any suitable shape such as circular, square or rectangular or the like.

The state information table 130 comprises details of one or more states used in a state transition flow with each state including one or more details such as the state number, state type, parameters, configuration data, screen numbers, next state information, and screen data. Although referred to herein as a state information table 130, this table 130 actually comprises a series of linked tables (for example, a card read table, a PIN entry table, a cash accept table, and the like), or a table with further tables nested therein. There is typically one or more table entries for each state type, plus other associated tables. The particular data structure that is chosen to store this state information is not critical.

Figure 3:
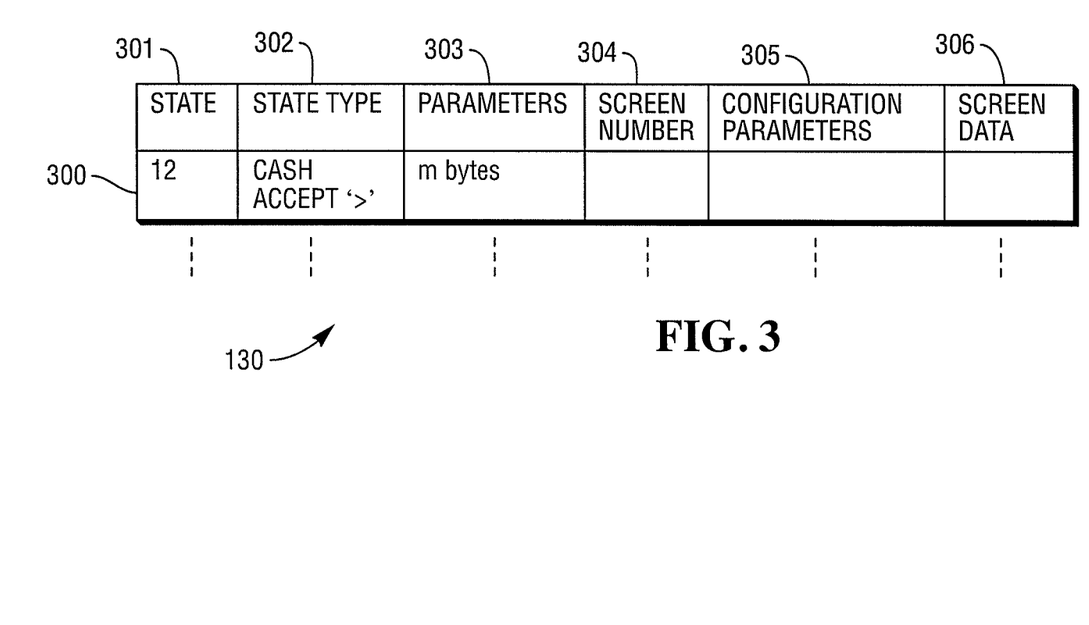
FIG. 3 illustrates a simplified excerpt from a state information table stored in the terminal of FIG. 1.

Reference will now be made to FIG. 3, which is a simplified excerpt from the state information table 130 for the long press selection state.

For illustration purposes, the state information table 130 is shown having only one entry 300 and six columns 301 to 306, although many more entries would exist according to certain embodiments of the present invention.

The first column 301 is the State Number column. This is populated with a unique number for each state in the state information table 130. In this example, for entry 300, the state number is "12".

The second column 302 is the State Type column. There are many possible state types, such as the Card Read state, the PIN Entry state, the Eight FDK state, the Close state, the long press state and the like. Each of these states has a unique identifier. For example, the Cash Accept state has the identifier ">".

The third column 303 is the Parameters column. There are a number of parameters that can be used in this column 303, including the key parameters that relate to which FDKs are to be enabled when the local application 121 is in the state for that entry 300 (which is state number 12 in this example).

The fourth column 304 is the Screen Number column. Each entry for this column includes a number corresponding to an associated screen.

The fifth column 305 is the configuration parameters, which relate to ATM configuration parameters, such as the length of time before a time-out is activated, the status messages used, and the like. These configuration parameters are conventional and not directly relevant to this embodiment.

The sixth column 306 is the Screen Data column. This column contains the screen data for the screen or screens to be presented on the customer display module 102 when the ATM 100 is in the state (which is state "12" for entry 300). The screen data for each screen also includes any screen dictionary 140 associated with that screen.

Although illustrated in FIG. 3 as a table, the state information may be stored as series of tables, or in any other convenient manner, which is why there is a number in column four referencing the associated screen data, even though the actual screen data is illustrated as residing in column six.

During operation of the SST, state table data is thus downloaded to the SST and thereafter operation follows accordingly. A user attends the SST and identifies themselves using a user card and password. A screen is then displayed to a user with a state table associated with that screen. Thereafter, the user selects the states in a transaction flow by pressing a key adjacent to a user's display (or on a region of a touchscreen if used). For example, during an early stage of a transaction a user is faced with a display screen indicating that a user should select a key to indicate whether they wish to receive currency or request a mini statement or make a currency deposit or make a balance enquiry. By pressing on an associated button or region, the user selects a service which is to be provided at the SST.

If a user selects one of the displayed options using a normal press of the user button, then a default mode is entered in which a service is provided to a user in a pre-determined manner. For example, if a user selects a mini statement with a normal press, then a mini statement will be printed having a pre-set number of last transactions shown. For example, the last five transactions may be printed out. A user is thus provided with options to select a service in a convenient and straightforward manner.

However, the way in which the user selects one of the options may be used to determine that further sub-options for providing that service should be displayed to the user. Therefore, if a user selects a mini statement option but does so by utilising a long press, that is to say, by maintaining pressure on the user button or region of the touchscreen for a period of time longer than a normal press, then a state is provided which optionally may include the display of a further screen associated with the service and provide a user with further selectable options. Other techniques for selecting this further mode of providing a service could of course be implemented, for example, by utilising two consecutive quick presses.

Part of entry 300 of the state information table 130 is shown in more detail in FIG. 4, which is a table 400 describing the Mini Statement Request state and its associated parameters in more detail subsequent to a user selecting a mini statement via a long press. Although this part of entry 300 is shown in tabular form, it is in fact stored as an entry in the state information table 130, and this one entry is illustrated in tabular form in FIG. 4 only for clarity of explanation and to aid understanding.

The long press state table 400 which may be utilised to handle a mini statement request comprises a table entry column 401 (which contains a unique entry number that is incremented for each entry), a number of bytes column 402 (which shows the number of bytes of data assigned to the contents for that entry), a contents column 403 (which describes the contents for that entry), and a description column 404 (which describes how to interpret the contents for that entry). The contents column 403 actually appears in the state information table 130; the other information is provided to aid understanding.

The first entry 410 indicates that one byte is used to designate the state type. In FIG. 4, the state type indicated is the Mini Statement Request state. This appears in the state information table 130 in row 300 column 302 as "z" (which is the code used to indicate a master expansion state).

The second to ninth entries 412, 413, 414, 415, 416, 417, 418, 419 are used to designate the key parameters (that is, the FDKs) and other data that are used when the ATM 100 is in the Mini Statement Request state.

More particularly, the second entry 412 is used to highlight the fact that this state table is a sub-state type as it is a state type associated with a long key press. The third entry 413 identifies a screen by an indexing screen number that is to be shown to the customer subsequent to the long press selection of the particular service. The displayed screen displays further options that a user selects to tailor the way in which a service is provided to the user. The fourth entry 414 identifies a state number for a state which is to be entered subsequent to a time out occurring at the SST. The fifth entry 415 indicates the state number of a state which is to be entered should a user cancel the current transaction, for example by pressing a cancel key.

The long press state table 400 which can be used for a mini statement request indicates that three FDKs should be enabled: a first button A FDK (entry 416), a second button B FDK (entry 417), and a third button C FDK (entry 418). Each of these three key parameters comprises three bytes that indicate which FDK on the ATM 100 is to be enabled for its defined function. If the first bit is active and the remaining seven bits inactive, then the first FDK is to be enabled. If the second bit is active and the remaining seven bits (bit one and bits three to eight) are inactive then the second FDK is to be enabled. It is also possible that multiple FDKs may be enabled for the same function; for example, if the first and second bits are both enabled, then the first and second FDKs could optionally both be enabled for the same function (for example, "Cancel").

The ninth entry 419 indicates a position in an operation code (OpCode) buffer in the SST in which data is to be stored responsive to which FDK button is pressed. As will be appreciated by those skilled in the art, subsequent to the completion of a whole transaction flow the contents, which are accumulated in the OpCode buffer, are transmitted to a remote host which then authorises or fails to authorise a transaction.

The data from column 402 and rows 412 to 419 appears in the state information table 130 in row 300 column 303 as a sequence of "m" bytes. Although only twelve bytes are illustrated for column 402 and rows 412 to 418, there are other bytes that are included in row 300 column 303 in addition to these twelve bytes, but these additional bytes are not relevant to this example. Furthermore, different state types may use a different number of parameters.

It will be appreciated that the state table 400 which can be used for a mini statement request is provided to give a human programmer an understanding of the meaning of the data structures used. The ATM 100 uses a sequence of bits as indicated in the number of bytes column 402 because the ATM 100 is aware that the first byte relates to the state type, the next three bytes relate to a sub-state type associated with a long press selection state. The next three bytes relate to a screen number utilised in association with the long press selection state for the particular state type being utilised. The next three bytes identify a time out next state number. The next three bytes identify a cancel next state number. The next nine bytes are associated with the state number a terminal will proceed to if a customer presses one of the three option buttons. The next three bytes relate to a buffer location in which a key code associated with a selected user button is to be stored.

Figure 5A:
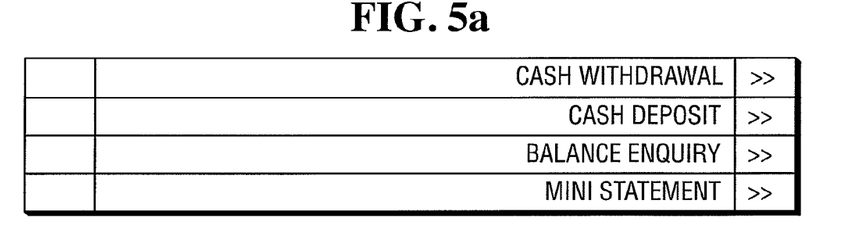
FIG. 5 illustrates the provision of a service via a first and a further mode of selection.

FIG. 5 illustrates the selection of a service and how a mode of selection will determine how that service is provided. More particularly, in FIG. 5A, a user is presented with a displayed page on a screen at the user terminal in which four options are provided for services. These services are "cash withdrawal", "cash deposit", "balance enquiry" and "mini statement". It will be appreciated that a user button is provided adjacent to each word and a user knows that by selecting the button proximate to the words defining the service which is to be provided, then that service will be selected. In FIG. 5A the user does not wish to specify any aspect of the service they require. In the example shown, the user selects the mini statement option and does this by executing a normal screen touch/FDK press on the appropriate user button. The state table for this particular option stores, in an OpCode buffer, data identifying that a default mini statement is being requested by the user. Subsequently, if this is authorised by a remote node a standard mini statement, for example, including details of the last five transactions, will be provided to a user.

Figure 5B:
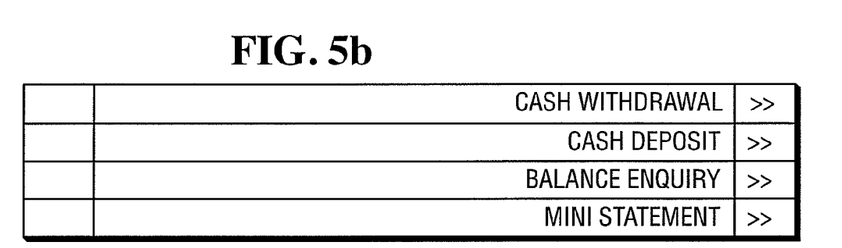
Figure 5C:
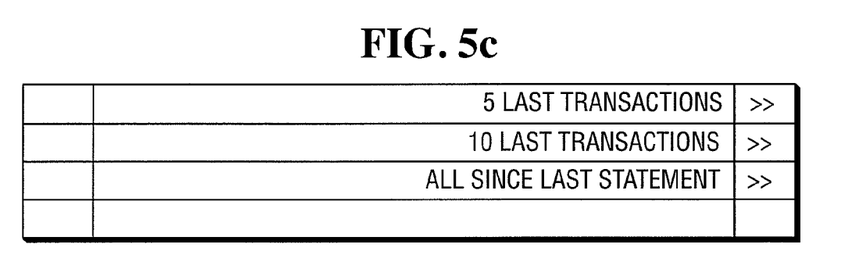

FIG. 5B illustrates how the same initial state as shown in 5A is presented to a user but in respect of the FIG. 5B option, the user selects the mini statement service by executing a long press on the touchscreen or FDK press associated with the mini statement option. Subsequently, rather than directly providing the user with the default mini statement, a subsequent screen is displayed as per the state table for the long press selection state for the mini statement service. The subsequent screen is illustrated in FIG. 5C. Here a user is provided with further options which will determine, once selected, how the service, in this case the provision of a mini statement, is provided to a user. As illustrated in FIG. 5C, three possible options are provided to the user as to ways in which the service is to be provided. For example, the mini statement can show the last five transactions. This in fact tallies with the default setting which would otherwise automatically have been provided had the user selected the service with a normal press. As an alternative, by pressing the next key down, the user can select a mini statement which includes details of the ten last transactions. Still furthermore, an option is provided to a user for a mini statement to be provided which includes all transactions since a last statement date. It will be appreciated that one, two or more options may be displayed at this point. Also, it is not necessary for the default setting to be included in the further options. It will also likewise be appreciated that even these further options could be the subject of further long press selection states. The host system is not affected by the long press optimisation.

Certain embodiments of the present invention thus provide the advantage that a user interface is simplified whilst still being able to offer a variety of transactions and a variety of ways in which those transactions may be delivered. A state flow is still used to configure the transaction selection flow. Furthermore, a central transaction processing system (remote node) does not need to be changed as the addition of a new state does not require a host change.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of operating a self-service terminal (SST), comprising the steps of:
   detecting, by the SST, an activation of a user button, based on a period of time in which pressure is maintained on the user button indicating the button is depressed by the user;
   offering, by the SST, a default operation for a service being offered at the SST that is responsive to the activation of the user button, the operation pre-assigned to the default operation associated with the service;
   indicating, by the SST, a plurality of selectable operations based on a different activation of the user button, the different activation determined by another period of time in which pressure is maintained on the user button that is longer than the activation associated with the default operation; and
   selecting, by the SST, a user chosen one of the selectable operations for the service as selected by the user.

2. The method as claimed in claim 1, further comprising:
   providing, by the SST, state table data associated with the service, said state table data comprising a screen number identifying a screen displayed to indicate the selectable operations.

3. The method as claimed in claim 2, further comprising:
   receiving, by the SST, said state table data from a host node remote from said SST; and
   storing, at the SST, said state table data.

4. The method as claimed in claim 2, further comprising:
   acquiring, by the SST, said state table data on power up of the SST.

5. The method as claimed in claim 1, wherein each step of pressing a user button element comprises:
   the user pressing a key on a user interface of the SST or a user pressing a respective region of a touchscreen element of a user interface of the SST.

6. The method as claimed in claim 1, wherein the SST is an automated teller machine (ATM) and the service comprises one of providing a mini statement or providing a currency withdrawal or providing a currency deposit at the ATM.

7. The method as claimed in claim 1, further comprising:
   said step of indicating a plurality of selectable operations comprises displaying a screen identifying the plurality of selectable operations, said selectable operations including said default operation.

8. The method as claimed in claim 1, further comprising:
   storing, by the SST, at least a character associated with the default operation or chosen operation in an operation code (OpCode) buffer at the SST.

9. The method as claimed in claim 8, further comprising:
   transmitting, from the SST, the stored OpCode buffer data to a host node remote from said SST; and
   receiving, by the SST, an authorization signal from the host node responsive to the transmitted buffer data.

10. The method as claimed in claim 9, further comprising providing, by the SST, a selectable service to the user of the SST.

11. A self-service terminal (SST), comprising:
    a display configured to present a display screen element, the display screen element is driven by a user interface that executes on a processor and the user interface having a plurality of user button elements arranged with respect to the display screen element; and
    memory included with the processor, the memory having a state information module that houses state table data to determine and to drive a cycle of operation for the SST; wherein
    at least one state from a plurality of possible states of the cycle of operation comprises a particular state in which a characteristic of a service is selected by a user and is chosen subsequent to determining if the user selected the service by executing a long press or normal press on a particular user button element associated with the selected service, a period of maintaining pressure on the particular user button element determines whether the long press or the normal press has occurred, with pressure resolved by a particular period that the particular user button element is depressed and activated by the user.

12. The SST as claimed in claim 11, further comprising:
    the state table data comprises a screen number that indexes screen data to be displayed on the display screen element subsequent to execution of a long press.

13. The SST as claimed in claim 11, further comprising:
    the state table data comprises the byte of an operation code (OpCode) buffer in which a key code associated with a pressed user button element is storable.

14. The SST as claimed in claim 11, further comprising:
the display screen element comprises a display screen and the user button elements comprise buttons adjacent to at least one edge region of the screen or the display screen element comprises a touchscreen and said user button elements comprise respective regions of the touchscreen.

15. A method of providing a user of a self-service terminal (SST) with a service, comprising the steps of:
providing, by the SST, a service in a first mode of operation that is responsive to a user who selects the service via a first mode of selection;
providing, by the SST, the service in a different mode of operation that is responsive to the user who selects the service via a different mode of selection; and
resolving, by the SST, the first mode of selection and the different mode of selection based on a period of time in which the user maintains pressure on an interface button of the SST indicating that the interface button is depressed and being activated by the user.

* * * * *